United States Patent
Carvey

[11] Patent Number: 6,128,290
[45] Date of Patent: *Oct. 3, 2000

[54] PERSONAL DATA NETWORK

[75] Inventor: Philip P. Carvey, Bedford, Mass.

[73] Assignee: BBN Corporation, Cambridge, Mass.

[*] Notice: This patent is subject to a terminal disclaimer.

[21] Appl. No.: 08/949,999

[22] Filed: Oct. 14, 1997

Related U.S. Application Data

[63] Continuation-in-part of application No. 08/611,695, Mar. 6, 1996, Pat. No. 5,699,357.

[51] Int. Cl.$^7$ ............................................. H04B 7/212
[52] U.S. Cl. ..................... 370/347; 370/350; 370/442; 370/509; 455/89; 364/708.1
[58] Field of Search .................... 370/347, 350, 370/442, 509, 512; 455/89; 364/708.1

[56] References Cited

U.S. PATENT DOCUMENTS

| | | | |
|---|---|---|---|
| 5,247,285 | 9/1993 | Yokota et al. | 361/680 |
| 5,297,142 | 3/1994 | Paggeot et al. | 370/461 |
| 5,307,297 | 4/1994 | Iguchi et al. | 364/708.1 |
| 5,371,734 | 12/1994 | Fischer | 370/311 |
| 5,481,265 | 1/1996 | Russell | 341/22 |
| 5,517,505 | 5/1996 | Buchholz et al. | 370/350 |
| 5,598,419 | 1/1997 | Weigand et al. | 370/514 |

*Primary Examiner*—Huy D. Vu
*Assistant Examiner*—Jasper Kwoh
*Attorney, Agent, or Firm*—Leonard Charles Suchyta; Floyd E. Anderson

[57] ABSTRACT

The data network disclosed herein utilizes low duty cycle pulsed radio frequency energy to effect bidirectional wireless data communication between a server microcomputer unit and a plurality of peripheral units located within short range of the server unit, e.g. within 20 meters. By establishing a tightly synchronized common time base between the units and by the use of sparse codes, timed in relation to the common time base, low power consumption and avoidance of interference between nearby similar systems is obtained.

11 Claims, 8 Drawing Sheets

PERSONAL DATA NETWORK

CROSS REFERENCE TO RELATED APPLICATION

This application is a continuation-in-part of application Ser. No. 08/611,695 filed on Mar. 6, 1996 now U.S. Pat. No. 5,699,357.

BACKGROUND OF THE INVENTION

The present invention relates to a data network and more particularly to a data network which can effect bidirectional wireless data communications between a microcomputer unit and a plurality of peripheral units, all of which are adapted to be carried on the person of the user.

The size and power consumption of digital electronic devices has been progressively reduced so that personal computers have evolved from lap tops through so-called notebooks, into hand held or belt carriable devices commonly referred to as personal digital assistants (PDAs). One area which has remained troublesome however, is the coupling of peripheral devices or accessories to the main processing unit. With rare exception, such coupling has typically been provided by means of connecting cables which place such restrictions on the handling of the units that many of the advantages of small size and light weight are lost.

While it has been proposed to link a keyboard or a mouse to a main processing unit using infrared or radio frequency (RF) communications, such systems have been typically limited to a single peripheral unit with a dedicated channel of low capacity.

Among the several objects of the present invention may be noted the provision of a novel data network which will provide wireless communication between a host or server microcomputer unit and a plurality of peripheral units; the provision of a data network which provides highly reliable bidirectional data communication between the peripheral units and the server; the provision of such a data network which requires extremely low power consumption, particularly for the peripheral units; the provision of such a network system which avoids interference from nearby similar systems; and the provision of such a data network system which is highly reliable and which is of relatively simple and inexpensive construction. Other objects and features will be in part apparent and in part pointed out hereinafter.

SUMMARY OF THE PRESENT INVENTION

The data network of the present invention utilizes the fact that the server microcomputer unit and the several peripheral units which are to be linked are all in close physical proximity, e.g., within twenty meters, to establish, with very high accuracy, a common time base or synchronization. The short distances involved means that accuracy of synchronization is not appreciably affected by transit time delays. Using the common time base, code sequences are generated which control the operation of the several transmitters in a low duty cycle pulsed mode of operation. The low duty cycle pulsed operation both substantially reduces power consumption and facilitates the rejection of interfering signals.

In addition to conventional peripheral devices such as a keyboard or mouse, it should be understood that data communications in accordance with the present invention will also be useful for a wide variety of less conventional peripheral systems which can augment the usefulness of a microcomputer such as a PDA. For example, displays are being developed which project a private image directly into an user's eye using a device which is mounted on a headband or eyeglasses. These displays are useful, for example, for providing combat information to military personnel and for realistic games. Likewise, so called virtual keyboards are being developed which use inertial or magnetic sensors attached to a users fingers in the manner of rings. Further, apart from more usual business type computer applications, the data network system of the present invention may also be useful for applications such as physiological monitoring where the peripheral units may be physiological sensors such as temperature, heartbeat and respiration rate sensors. As will be understood, such peripheral units may be useful for outpatient monitoring, monitoring for sudden infant death syndrome, and for fitness training. It is convenient in the context of this present description to refer to such conventional and inconventional peripheral units collectively as personal electronic accessories (PEAs).

Briefly stated, a data network system according to the present invention effects coordinating operation of a plurality of electronic devices carried on the person of the user. These devices include a server microcomputer and a plurality of peripheral units which are battery powered and portable and which provide input information from the user or output information to the user. The server microcomputer incorporates an RF transmitter for sending commands and synchronizing information to the peripheral units. The peripheral units, in turn, each include an RF receiver for detecting those commands and synchronizing information and include also respective RF transmitters for sending information from the peripheral unit to the server microcomputer. The server microcomputer includes a receiver for receiving that information transmitted from the peripheral units.

The server and peripheral unit transmitters are energized in low duty cycle pulses at intervals which are determined by a code sequence which is timed in relation to the synchronizing information initially transmitted from the server microcomputer.

DESCRIPTION OF THE PREFERRED EMBODIMENT

Figure 1:
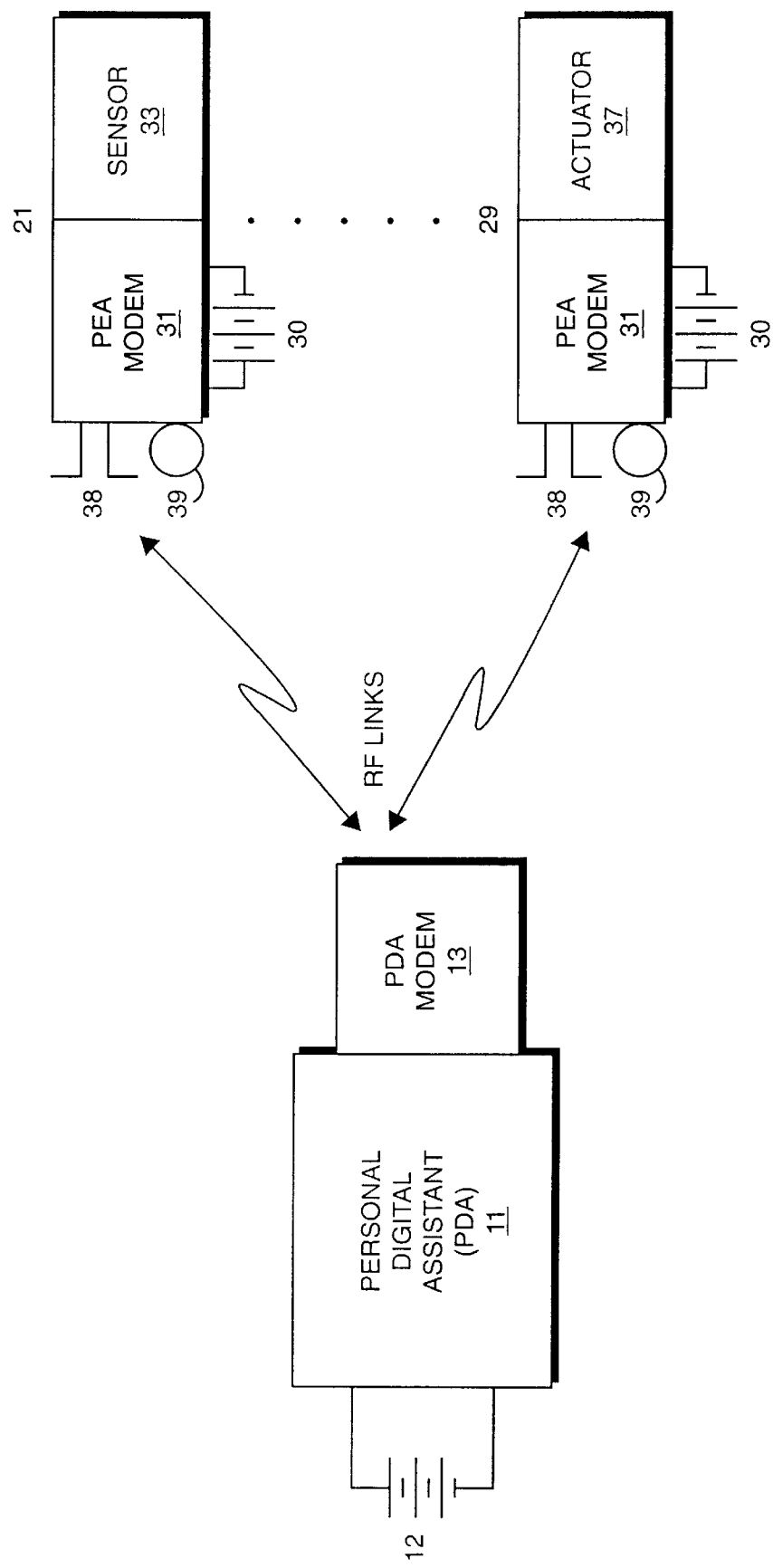
FIG. 1 is an overall block diagram of a wireless data network system linking a personal digital assistant or server microcomputer with a plurality of peripheral units.

Referring now to FIG. 1, a server microcomputer of the type characterized as a personal digital assistant (PDA) is designated generally be reference character 11. The PDA may also be considered to be a HOST processor and the HUB of the local network. The PDA is powered by a battery 12 and may be adapted to be carried on the person of the user, e.g. in his hand or on a belt hook. Such PDAs typically accept options which are physically configured as an industry standard PCMCIA card. In accordance with the present invention such a card, designated by reference character 13 is implemented which includes a PCMCIA interface and PDA modem.

As is described in greater detail hereinafter, the network system of the present invention establishes wireless communication between PDA 11 and a plurality of peripheral units or PEAs designated generally by reference characters 21–29. A PDA and a collection of PEAs associated with it are referred to herein as an "ensemble". The present invention allows the creation of a data network linking such an ensemble of elements with minimal likelihood of interference from similar ensembles located nearby. Each of the peripheral units is powered by a respective battery 30 and incorporates a PEA modem 31. Further, each peripheral unit can incorporate a sensor 33, which responds to input from the user or an actuator 37 which provides output to the user. Some peripheral units might also employ both sensors and actuators. As illustrated, each PEA modem preferably incorporates two antenna's, a dipole antenna 38 for reception and a loop antenna 39 for transmitting. The use of separate antennas for transmitting and receiving facilitates the utilization of impedance matching networks which in turn facilitates the operation at very low power.

Figure 2:
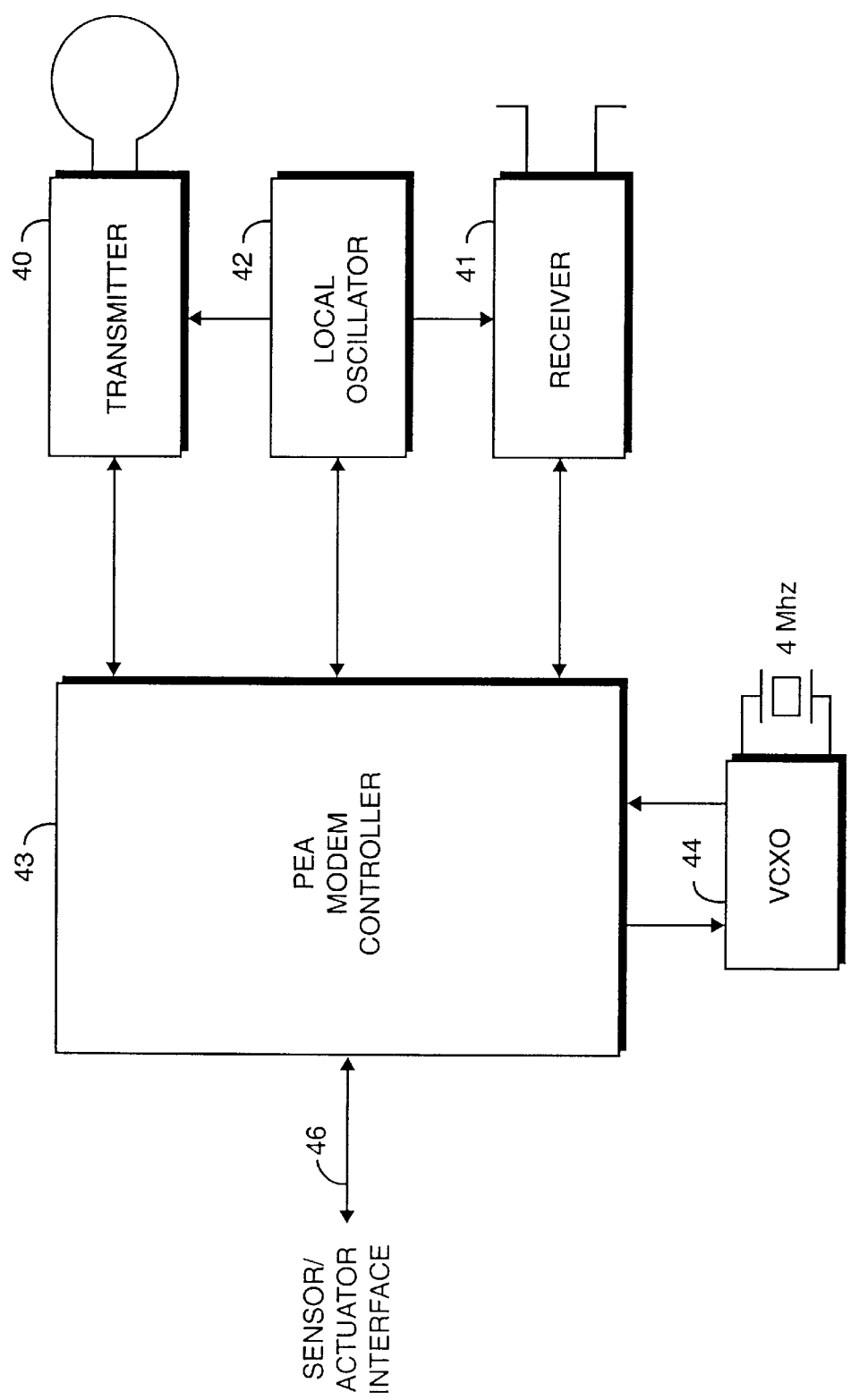
FIG. 2 is a block diagram of a modem circuitry employed in one of the peripheral units of FIG. 1.

Referring now to FIG. 2, the PDA modem illustrated there comprises five major components, a transmitter 40, a receiver 41, a local oscillator 42 which is shared by the transmitter and the receiver, a controller 43 which times and coordinates the operations of the transmitter, receiver, microprocessor and, finally, a voltage controlled crystal oscillator oscillator 44 which is utilized in maintaining a common time base with the host microcomputer. The oscillator 44 utilizes a crystal which operates at 4 Mhz.

As is described in greater detail hereinafter, the controller 43 sequences the operations necessary in establishing synchronization with the host system, adjusting the oscillator 44, acquiring from the host appropriate code sequences to be used in data communications, in coupling received information from receiver 41 to a sensor/actuator interface, designated by reference character 46, and in transmitting data from the interface 46 back to the host through transmitter 40. The controller in one embodiment is partitioned into a commercially available general purpose microprocessor such as the PIC16C64, together with a special purpose logic integrated circuit (IC). The special purpose IC implements those functions which cannot be efficiently executed on the general purpose microprocessor. For example, the clock to the PIC16C64 is sourced by the special purpose IC because even in the microprocessor's so-called "sleep" mode, its power consumption is higher than acceptable.

As is explained in greater detail hereinafter, the general scheme of data transmission and reception is a form of time division multiple access (TDMA). This TDMA access is characterized by a frame interval, common to the host and all PEAs of 32.768 milliseconds, segmented into 16,384 time slots. Each time slot is further partitioned into four data bit intervals during which the RF carrier is modulated either above the the nominal for a binary "one" or below the carrier for a binary "zero". The basic modulation scheme is frequency shift keying (FSK), well known to those skilled in digital radio transmission. However, as is explained in greater detail hereinafter, the FSK tones are transmitted in only those slots indicated by a TDMA program. Both the host and all PEAs share a common TDMA program at one time. For each slot, this TDMA program indicates that a PEA or host is to transmit, or not, and whether it will receive, or not. In the intervals between slots in which a PEA is to transmit or receive, all receive and transmit circuits are powered down.

Figure 3:
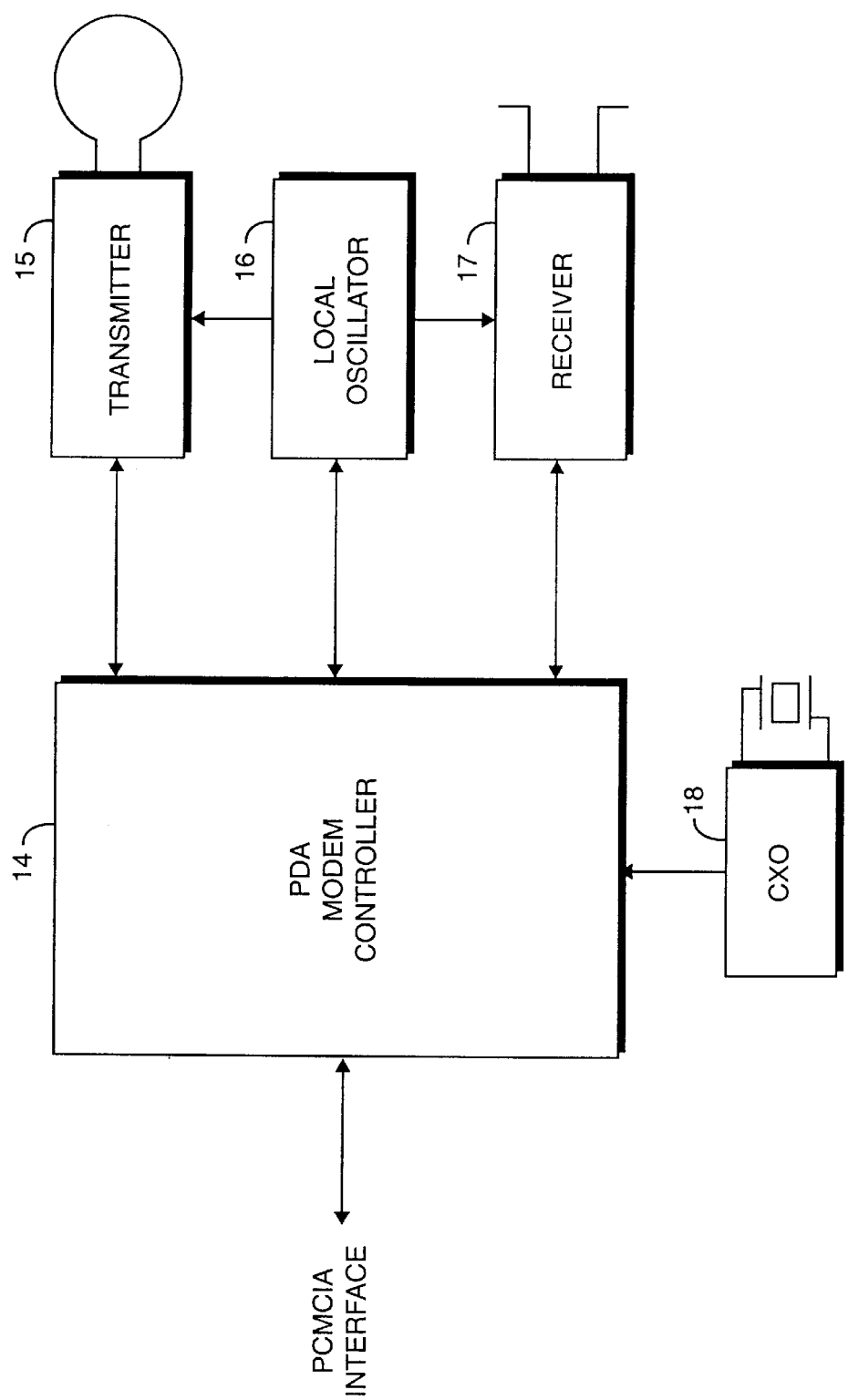
FIG. 3 is a block diagram of a modem circuitry employed in the server microcomputer of FIG. 1.

Referring now to FIG. 3, the PEA modem illustrated there comprises five major components, a transmitter 15, a receiver 17, a local oscillator 16 which is shared by the transmitter and the receiver, a controller 14 which times and coordinates the operations of the transmitter, receiver, and PCMCIA interface and, finally, a crystal oscillator 18 which is utilized in maintaining the network time base. The oscillator 18 utilizes a crystal which operates at 4 Mhz. There are no differences between the receiver, local oscillator, and transmitter in both the PEA and PDA modems. PDA controller 14 differs from the PEA modem in three ways. First it contains no synhronization capability as it serves as the network master. Secondly, it includes a PCMCIA interface rather than a sensor/transducer interface. Only the PEA modem is described in detail herein since it is includes all the novel capabilities of the PDA modem.

Figure 4:
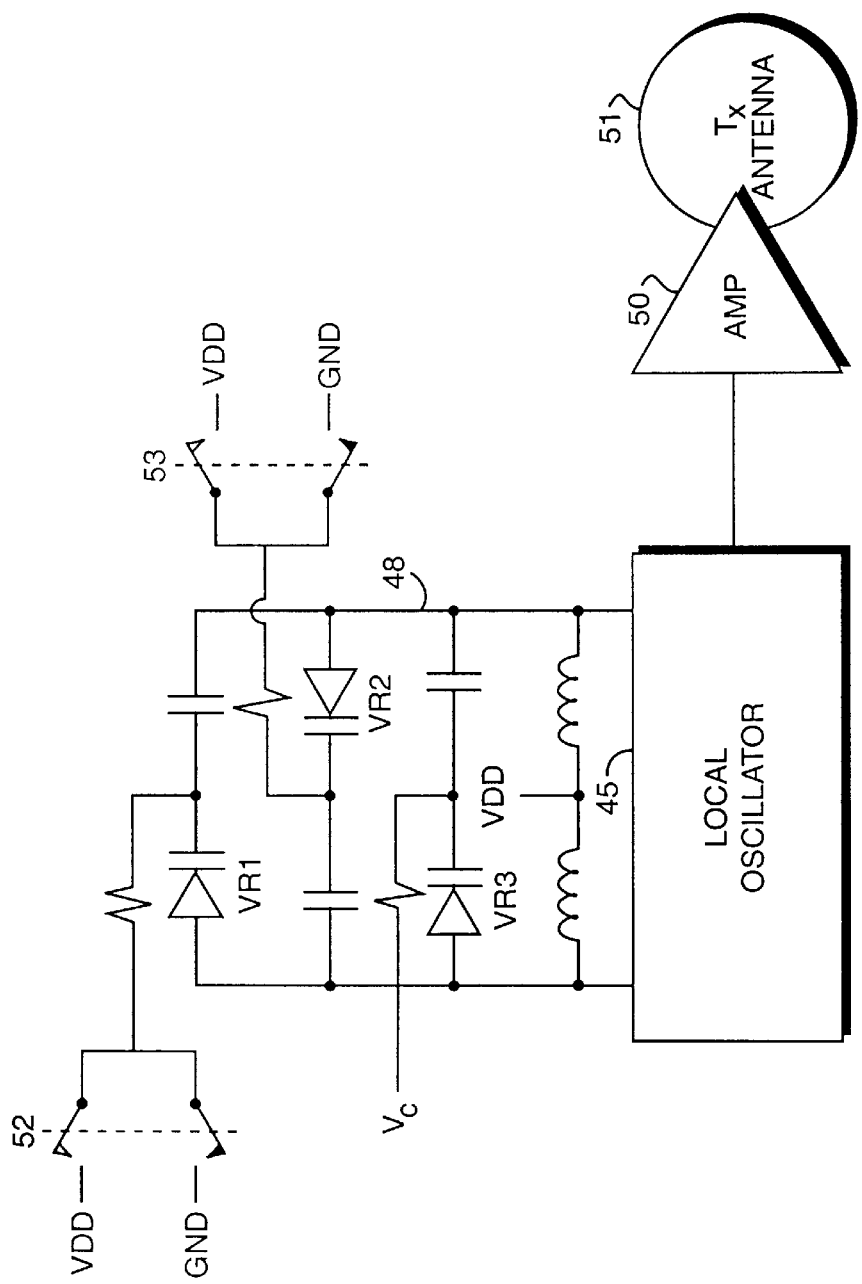
FIG. 4 is a block diagram of the transmitter circuitry employed in the modem of FIG. 2.

Referring now to FIG. 4, transmission is effected using the local oscillator 45 to drive the transmit antenna amplifier 50 whose output drives transmit antenna 51. The local oscillator 45 is coupled to a tuning network 48 including a plurality of frequence adjusting varactors VR1–VR3. Operation of the varactors is controlled by switch pairs 52 and 53. 500 nanoseconds before the start of transmission, the local oscillator 45 is powered up. During this period and during all receive intervals, frequency selection varactor switches 52 and 53 are opened and closed respectively. This frequency selection state is employed for all periods except those in which the local oscillator is used to drive the antenna amplifier. To transmit a "one", both switches 52 and 53 are opened. This causes the oscillator to oscillate above its nominal value. To transmit a "zero", both switches 52 and 53 are closed. This causes the oscillator to oscillate below its nominal value. The local oscillator output then drives amplifier 50. In the preferred embodiment, the transmit antenna 51 is loop of wire two centimeters in diameter. During short periods in which data is not being received nor is being transmitted, the oscillator is powered and the varactor control voltage Vc is adjusted such that the oscillator frequency equals the carrier frequency.

Figure 5:
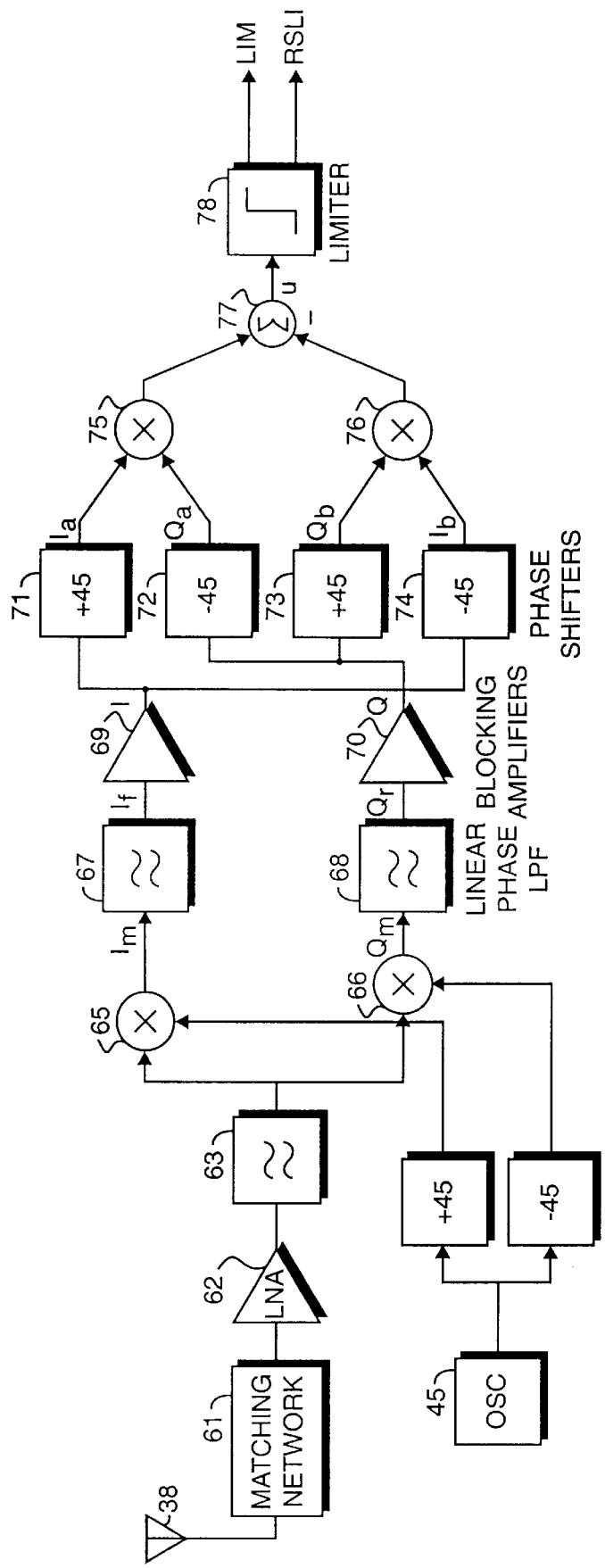
FIG. 5 is a circuit diagram of receiver circuitry employed in the modem of FIG. 2.

Referring now to FIG. 5, the input signal from the receiving antenna 38 is applied, through an impedance matching network 61 to a low noise amplifier 62 and bandpass filter 63. The received and amplified signal is combined with the local oscillator shifted 45 degrees in phase in mixer 65 to produce signal Im and combined with the local oscillator shifted −45 degrees in phase in mixer 66 to produce signal Qm. Im and Qm are the so-called "in-phase" and "quadrature-phase" signals commonly known to radio engineers. Both Im and Qm are centered at zero hertz rather than at an intermediate frequency. This scheme is commonly referred to as "direct conversion" because a direct conversion to baseband is effected rather than conversion to an intermediate frequency which is then converted to baseband. Direct conversion reduces power consumption, as no intermediate frequency circuits are employed and it allows use of low pass filters to effect selectivity. Lowpass filters 67 and 68, preferably of the linear phase type, remove the unwanted mixing products and provide selectivity of signals Im and Qm respectively.

The filtered output signals If and Qf passed through blocking amplifiers 69 and 70 to form signals I and Q. The supply currents of amplifiers 69 and 70 are adjusted so that the parasitic output capacitance of these amplifiers effectively form a bandpass filter with gain. These amplifiers block frequencies below 100 KHz and above two MHz. This filtering adds to the overall selectivity and blocks any unwanted DC mixer byproduct common to direct conversion schemes.

Some conventional frequency discriminators create the signal $V=I*dQ/dt-Q*dI/dt$. When the frequency of the received signal is above the local oscillator frequency, V is greater than zero. Correspondingly, when the frequency of the received signal is below the local oscillator frequency, V is less than zero. This scheme has the advantages of being totally insensitive to both amplitude and phase errors between I and Q mixer stages. Its disadvantage is that it requires the creation of the time derivatives of I and Q. As is well known, precise derivative forming circuits and and difficult to implement and power consumptive.

To circumvent the disadvantages of derivative forming networks and still keep the advantages of the frequency discrimination scheme, the receiver employs all pass phase shifters 71, 72, 73 and 74 to create the signals Ia, Qa, Qb and Qc respectively. Multipliers 75 and 76 together with adder 77 then form the signal $U=Ia*Qb-Ib*Qa$. The advantage is that U has the same desirable properties of a discriminator based on $I*dQ/dt-Q*dI/dt$ without requiring differentiation. It is only required that Ia and Ib be separated by 90 degrees and that Qa and Qb be separated by 90 degrees. As is well known, all pass networks consisting of a resistor and capacitor can be used to effect this phase separation. These networks produce an accurate 90 degree phase separation over a frequency range well in excess of the blocking amplifier bandpass and consume extremely low power consumption.

Limiter 78 then amplifies U to form signal Lim. Limiter circuits which can generate these signals are well known and have been integrated into integrated receiver chips for many years. Limiter output Lim is utilized by the controller 43 in both establishing the common time base and in recovering the data transmitted as described in greater detail hereinafter.

FRAME STRUCTURE

As indicated previously, the basic scheme for allowing multiple Personal Electronic Assessocies (PEAs) to communicate with the common server microcomputer (PDA) may be characterized as a form of time division multiple access (TDMA). A single virtual channel can be established between the PDA and any one PEA by assigning one or more slots within the 32.768 millisecond frame. In the preferred embodiment, four data bits are transmitted during each slot interval with the designation of a binary one or zero encoded by means of frequency modulation of the RF carrier as described previously. In slots where a PEA neither transmits nor receives, essentially all of the modem circuits are powered off, thus effecting a substantial power reduction. As is described in greater detail hereinafter, some slots are used to establish synchronization between PEA and PDA and others are used to implement a control channel. These slots are not assigned to a particular PEA but are rather shared amongst all PEAs.

In normal operation, each virtual channel is half duplex, transfering data either from PEA to PDA or from PDA to PEA. Assignment of a single slot per frame results in a virtual channel bandwidth of 122 bits per second. Virtual channels requiring larger bandwidths are assigned a multiplicity of slots. For example, when ten slots are assigned, the virtual channel bandwidth is increased to 1220 bits per second. More than one virtual channel can be established between the PDA and a single PEA. If one channel is outgoing from PDA to PEA while the other channel is incoming from the PEA to the PDA, an effectively full duplex communication link is constructed. It is possible for each virtual channel to differentiate bandwidths. Another possible operational mode is for the data transfer direction of a single virtual channel to be changed dynamically. A control channel can be employed whose sole purpose is to indicate the data flow direction on the data channel. Changeover from one direction to another is typically affected at the frame boundary.

A single virtual channel may be shared amongst several PEAs under control of the PDA. In this operational mode, a control virtual channel is employed to indicate to the ensemble of PEAs sharing the channel which is to transmit at any given time. Still another operational mode occurs when a single virtual channel is used to broadcast information from PDA to multiple PEAs. While it is possible to establish virtual channels between two PEAs, the increased worst case separation possible from one PEA to another PEA may preclude establishment of a reliable radio link. Therefore PEA to PEA links are not present in the preferred embodiment. While all these operational modes appear different, they are essentially well known variants to the underlying time division multiple access technique.

TDMA allows an ensemble of PEAs and PDA to establish a wide assortment of non-conflicting, error free, virtual channels between PEAs and PDA. When two different ensembles of PEAs and PDA happen by chance to employ the same carrier frequency, it is possible for the RF bursts of one ensemble to overlap those of the other ensemble. This overlap can cause errors. If during a particular bit period, two RF bursts are being simultaneously received, one from a transmitter in the home ensemble and the other from a foreign ensemble, the receiver will "capture' only the data received from the stronger of two transmitters. This well known aspect of FM modulation, results in an error free channel when the stronger transmitter is part of the home ensemble and can result in errors when the stronger transmitter is part of a foreign ensemble. While it is very likely that the stonger transmitter is part of the home ensemble, there are circumstances in normal operation where the stonger transmitter will part of a foreign ensemble. Note that even when a foreign transmitter is of much greater power than the home transmitter, if the foreign RF bursts and home RF burst do not overlap, no error occurs.

As is well known, many channel errors can be corrected by employing Error Correction Codes (ECC). In this technique, data to be sent over a channel is segmented into words of length M. A checksum of length C is computed as the word is being transmitted and also sent across the channel. For the M bits of data, a total of $N=M+C$ bits of channel bandwidth are utilized. For a fixed word length, as the number of error bits which can be corrected increases, the channel efficiency decreases. As a general rule, as the channel's error rate increase, the channel bandwdith efficiency (needed to achieve a certain corrected error rate) decreases and the minimum wordsize increases. In one of the simplest error correction schemes, called majority coding, where data bit is transmitted three time ($M=1$, $C=2$), channel bandwidth is reduced to 33%.

In channels where errors occur in bursts, single error correction codes, even though they have high channel efficiency, will yield poor after correction error rates. In interleaving, a well known scheme to handle burst errors, data is segmented into words which are then interleaved onto the channel. If the maximum error burst consists of four consecutive errors, then interleaving four words results in each burst occuring in a separate codeword. Since each codeword now has only one error after interleaving, it can be corrected.

Yet another means for correcting errors is to packetize the data and retransmit on detection of a checksum error. For virtual channels not requiring low latency, the highest channel efficiencies are possible. Hybrid schemes where error correction codes are employed together with retransmission of packets on checksum errors are also possible.

Error rates caused by the interference of RF bursts between two different ensembles can be significantly reduced by judicious assignment of slots in each ensemble. One assignment scheme that has desirable properties employs majority encoding and the use of so-called Optically Orthogonal Codes (OOCs). In this scheme, the 16384 slots are equally segmented into 256 intervals called sectors. A maximum of three RF bursts can occur in each section. The position of each burst is dictated by a one in an OOC codeword. Codewords have unity auto-correlation and cross-correlation with respect to rotation by an arbitrary number of slot positions within a sector. The codes are mostly zeros with three scattered ones representing the locations of the slots in which RF bursts are to be transmitted or received. There are ten OOC codewords with a sector length of 64 slots. In general, a sector can be assigned any one of the ten codewords with a rotation of from zero to 63 slot positions.

To assign slots in an ensemble, one of 640 different combinations of codeword and rotations is selected for the first sector. A codeword/rotation combination is selected for the second section such that 1) the last RF burst postion of the last sector codeword and the two RF burst postions of the new codeword do not form a codeword and 2) the last two RF burst positions of the last sector codeword and the first RF burst position of the new codeword do not form a codewords, and 3) the codeword/rotation has not been selected before. Each sector consists of three identical RF bursts (i.e a majority error correcting code is chosen).

At any instant of time, the frame structures of two ensembles will in general not be aligned. However, with their uncorrelated separate time bases, the frame structures will slip past one another and will become aligned. Every possible correlation between the two frames will thus eventually occur. Assuming each ensemble is using 100% of its bandwidth, then it is highly likely that at some time a codeword in each ensemble will be aligned. When codewords from separate ensembles are aligned, a receiver captures data from the stronger transmitter. In this case, the error correction coding serves no value since it perfectly corrects the data of the foreign transmitter. When this condition occurs, the probability that another sector is also aligned is about 0.002. Thus one sees a worst case uncorrectible error rate of about 0.001. As is well known, this uncorrectible error rate is sufficiently low that, by employing packetizing and retransmitting on checksum errors, an effectively error free channel can be obtained.

As will be understood by those skilled in the art, the TDMA system is greatly facilitated by the establishment of a common frame time base between PEA and PDA. In establishing this common time base, the present invention employs timing or synchronization beacons (SBs) transmitted by the PDA. Each SB consists of eight RF bursts spread out over 252 slots. One of the SBs arbitrarily starts a frame. The positions of the remaining seven SBs are selected pseudo-randomly with two restrictions. First the maximum interval between two successive SBs is less than 6.144 milliseconds. Secondly, the positions must allow a unique frame determination based on the intervals between SBs. Thus for example, equidistantly spaced SBs are not allowed.

In accordance with one aspect of the present invention, the slot location of each RF burst within all SBs is identical for all ensembles. In a particular ensemble, the 32-bit data bit pattern of each SB will be identical. Between two different ensembles, however, the SB data bit pattern, chosen randomly, will be quasi-distinct. The combination of SB data bit pattern and SB locations allow every ensemble to be uniquely identified.

Figure 6:
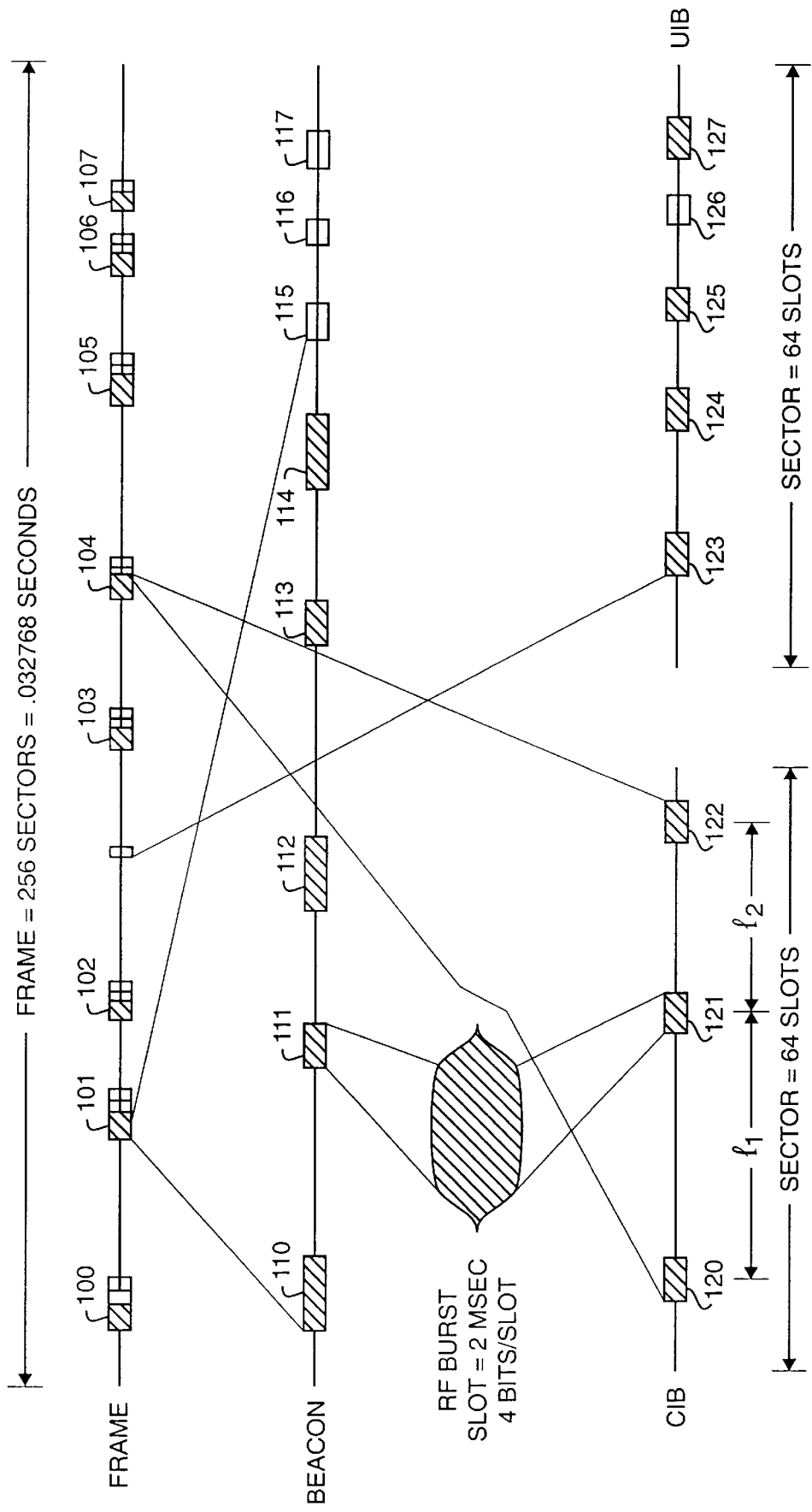
FIG. 6 is a diagram illustrating timing of RF signals which are transmitted between the server microcomputer and the various peripheral units.

In the preferred embodiment illustrated in FIG. 6, each of the eight SBs 100–107 is immediately followed by a sector assigned to the common Communication and Control Channel (CCC). The sector immediately following the first seven CCC sectors is assigned to the Attention Channels (ACs). The CCC sectors are designated by reference characters 110–117 in FIG. 6 while the Attention Channels are designated by reference characters 120–127. As will be explained in greater detail later, the CCC and AC are used in maintaining the virtual channels between PDA and all PEAs.

Figure 7:
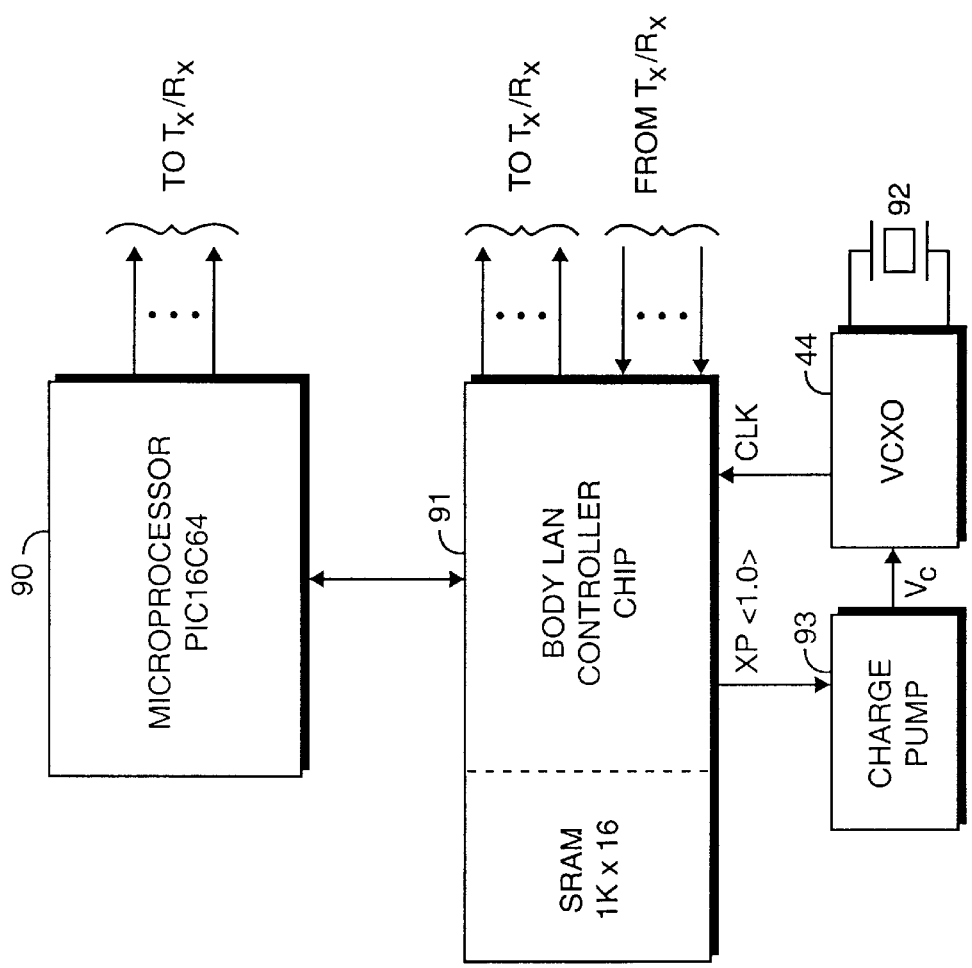
FIG. 7 is a block diagram of the controller employed in the PEA modem.

Referring now to FIG. 7, all PEA activities are activated and monitored by the PEA controller 43. While the controller could be implemented in a single custom integrated circuit, the present embodiment partitions the controller into a commercially available microprocessor 90, a PIC16C64, a special purpose logic integrated circuit IC 91, voltage controlled crystal oscillator 44, and a charge pump voltage generator 93. Voltage controlled crystal oscillator (VCXO) 44 is controlled by voltage Vc, sourced by charge pump 93. The controller IC 91 can cause the frequency of oscillation to change by activating charge pump. Varying the control voltage Vc from 0 to −6 volts changes the oscillator frequency by 50 parts per million. VCXO 44 is powered continuously and serves as the time base for all activities. The microprocessor chip includes 256 bytes of ROM which contains the program instructions needed for all activities and 256-bytes of SRAM used in program execution.

The controller IC 91 serves as the primary control agent for all activities. It contains registers, counters, Finite State Machines (FSMs), and as will be explained in more detail later, a Digital Matched Filter (DMF) used to detect synchronization and attachment beacons, and a 1024×16-bit SRAM used to store the usage sector assignments in the PEAs TDMA plan. While some of the activites are implemented without microprocessor intervention, most activities involve the microprocessor execution of short instruction sequences. Normally, the microprocessor clock, sourced by controller IC 91 is inactive, thus reducing power consumption. When microprocessor intervention is required, controller IC 91 activates the microprocessor clock and issues an 8-bit code over the interconnecting bus to indicate what activity the microprocessor is to perform. When the microprocessor has completed its program sequence, it issues a code to controller IC 91 indicating completion. Controller IC 91 then inactivates the microprocessor clock returning the micrprocessor into its minimum power consumption state.

To reduce power consumption by the controller IC 91, only a very small percentage of the logic is clocked continuously. Clocks to all remaining sections of controller IC 91 are enabled only when required. As is common practice in low power designing, the supply voltage of all internal logic is reduced to one volt and implemented with special low voltage cell designs.

The PEA controller 43 operates in one of three major states: Unattached (U), Sleep (S), and Active (A). These states and the state change conditions are described below.

In the Unattached state, the controller has not been personalized by any particular PDA. It cannot function normally until it receives information contained in an attachment packet. This packet is sent over a communications link formed when the PDA modem broadcasts Attachment Beacons in response to the user's request. An Attachment Beacon (AB) is composed of RF bursts having the same interval spacings as Synchronization Beacons but with a particular bit pattern.

Figure 8:
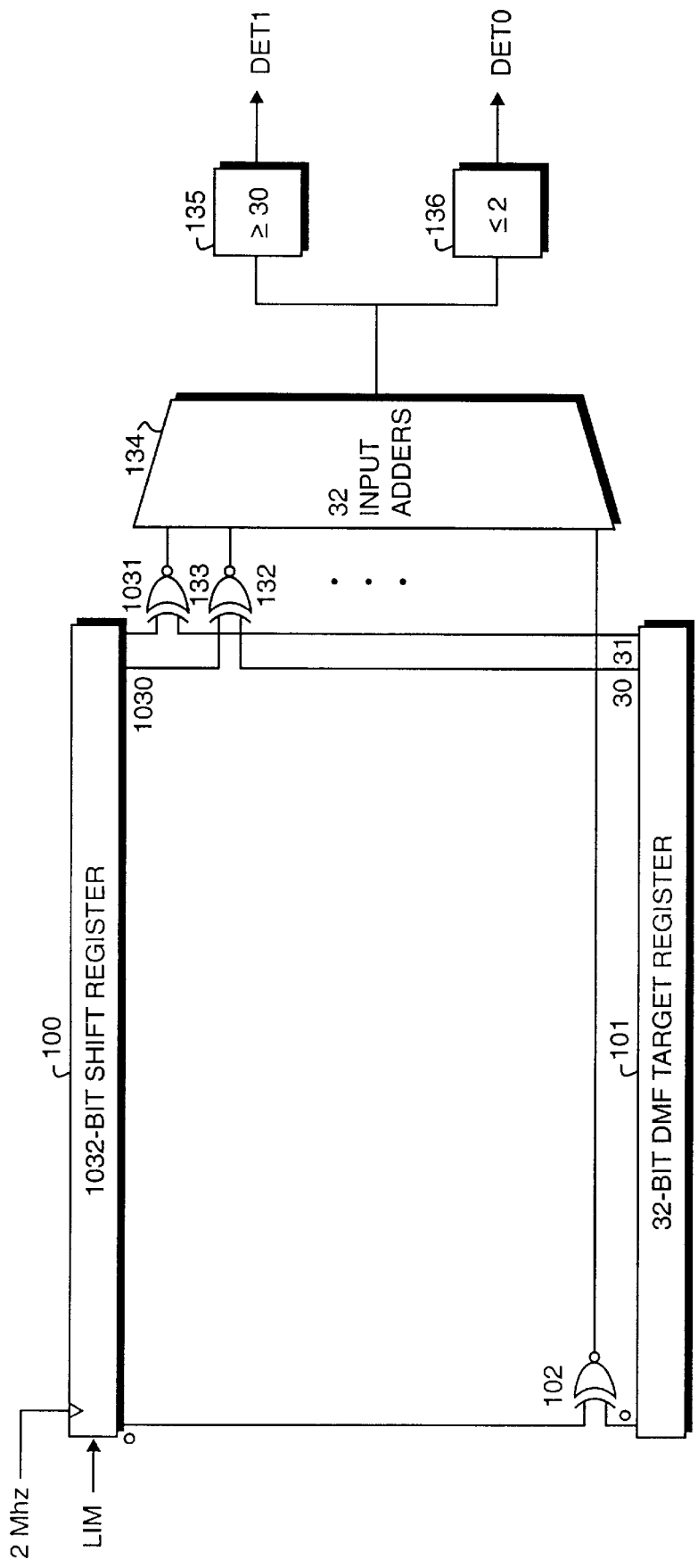
FIG. 8 is a block diagram of the digital matched filter employed in the PEA controller; and Corresponding reference characters indicate corresponding parts throughout the several view of the drawings.

A pair of Digital Matched Filters (DMFs) implemented in controller IC 91 are the primary means for both receiving the attachment packet and for establishing synchronization. As shown in FIG. 8, each DMF is composed of 1032-bit shift register 100, 32-bit DMF Target register 101, 32-comparitors 102–133, a 32-input adder 134, and two 6-bit comparitors 135 and 136. Limiter 78 output sources data to each DMF. One DMF is clocked on the positive edge of a 2 MHz clock derived from VCXO 44 while the other is clocked on the negative edge. Each of the 32-taps on the shift register correspond to bit locations of Syncronization and Attachement Beacons. The 32-bits from the shift register are compared, bit for bit by exnor gates 102–133 with the target bit beacon bit-sequence held in DMF Target Register 101. Adder 134 sums the number of comparitor matches. A sum equal to zero indicates that each shift register tap is exactly the compliment of the DMF Target Register 101 while a sum equal to thirty-two indicates that each shift register tap exactly matches the corresponding bit in the DMF Target Register 101. As is understood by those skilled in the data communications arts, a more robust detection scheme results when detection allows a few errors to occur rather than requiring a perfect match. Accordingly, comparitor 135 detects a match when the sum is greater or equal to thirty while comparitor 136 detects an unmatch when the sum is less than or equal to two.

At the end of each 500 nanosecond bit period, the two DMF's thus indicate one of three conditions, target match, target compliment match, and no match. The DMF can thus form a communications channel between transmitter and receiver without the receiver being synchronized to the transmitter in the manner utilized after attachment, i.e. after the PEA has become part of the ensemble. A target match indicates a logic 'one' and digit received condition while a target compliment match indicates a logic 'zero' and digit received condition. With eight Attachment Beacons transmitted per frame, an asynchronous 244 bit per second communications channel can be formed between the PDA and an unattached PEA by detecting these Attachment Beacons or their compliments.

An Unattached PEA initiates an Attachment Beacon search procedure every 8 seconds. In this procedure, the controller enables the DMF to detect Attachment Beacons. It allows the search to continue, attempting to match the attachment bit pattern (or its compliment) every 250 nanoseconds. If no Attachment Beacon is detected during a search period of 6.144 milliseconds the PEA terminates the search and reenters its low power condition until the next search is initiated. When an Attachment Beacon AB or its compliment is detected, it then expects to quasi-periodically receive additional AB each within a 6 millisecond period of the previously received AB. This succession of ABs forms an HDLC channel using bit-stuffing to delineate the beginning and end of a packet.

A single packet of information (the Attachment Packet) is transmitted over and over by the PDA during the attachment procedure, interleaved with the Synchronization Beacons. This packet contains all information needed to establish a Command and Control Channel (CCC) connection between the PEA's microprocessor and the PDA's microprocessor. The packet contains the Synchronization Beacon code, the Synchronization Beacon interval spacings, and a 6-bit identification number issued to each PEA. A 16-bit checksum at the end of the packet allows the PEA to verify correct packet receipt. Total packet length, including the 8-bit start of packet flag is 84 bits. Receipt of an Attachment Packet thus requires a worst case of 0.69 seconds. Once an Attachment Packet has been received, the PEA enters the Sleep state.

In this state, the PEA has sufficient information to synchronize itself to the Synchronization Beacons (SB) normally broadcast by the PDA. It can synchronize itself to the home PDA since it has the Synchronization Beacon bit pattern and the intervals between Synchronization Beacons.

In the Sleep state, a PEA initiates a Synchronization Beacon search procedure every 8 seconds. This procedure is identical to that employed in attachment except that the Synchronization Beacon code contained in the Attachment Packet is stored in the DMF Target Registers. If a Synchronization Beacon is not detected within 6.144 milliseconds, it is assumed that the home PDA is not near enough for synchronization to proceed. It then powers off all circuits except the alarm clock circuits which reinitiates the Synchronization Beacon search procedure 8 seconds later.

Once a single Synchronization Beacon is detected, the PEA assumes that its home PDA is nearby and that it should acquire synchronization. It acquires synchronization in two stages. When the first Synchronization Beacon is detected, a 14-bit counter is cleared. This counter, clocked at the slot clock rate, then continues counting.

When the next Synchronization Beacon is detected, the upper 8-bits of the counter are stored in an interval register and the upper 6-bits of the counter are cleared. The lower 6-bits are then compared against zero. Under worst case clock tolerance, the low 6-bit value should be zero plus or minus 0.25 clock periods. If the low order counter bits are zero no action is taken. Charge pump 93 is activated to increase the VCXO frequency. The interval is compared against each of the seven interval values loaded in the Attachment Packet, no two of which are identical.

After the third Synchronization Beacon is detected, the process is repeated. This time, the interval is compared against the next interval in the Synchronization Beacon interval table with the assumed framing established from the first interval. Again the charge pump is activated to increase the VCXO frequency if needed. This process of comparing intervals and adjusting the crystal oscillator continues until the PEA has a reliable indication that framing has been established and that the crystal oscillator frequency is very close to that of the PDA. When this occurs the second phase of synchronization, called phase alignment, is entered.

In the phase alignment stage, the first four bursts of the Synchronization Beacon are used to adjust the phase of the VCXO. The bit pattern of the first four bursts of all Synchronization Beacons is either 0011 or 1100. This simplifies the phase adjustment process. VCXO frequency adjustment is one sided in that BCC can only increase frequency via the charge pump. Leakage currents in the charge pump cause the frequency to decrease. Thus by monitoring the percentage of time that the Syncronization Beacon transitions are ahead or behind the 2 MHz bit clock, the microprocessor can determine when synchronization is established.

After the PEA acquires synchronization, it sends a status code over the Attention Channel assigned to that PEA.

Each frame contains seven sectors assigned to Attention Channel groups. These sectors follow the sectors assigned to the Command and Control Channel sectors which immediately follow the eight Synchrnonization Beacons. Eight successive frames provide a total of 56 Attention Channels, one for each of the 56 possible PEAs. After the PEA acquires synchronization, it sends a status code over the Attention Channel assigned to the PEA indicating that it has just acquired synchronization and is requesting activation. Each PEA is required to send a status code in its respective Attention Channel once every eight frames. The PEA and PDA microprocessors then go through a protocol which checks that the PEAs TDMA plan is current. If the PEA's TDMA plan is not current, the PDA then loads the new TDMA plan into the PEA's TDMA memory and enables the PEA to enter the Active state.

The basic unit of the TDMA plan is a User Data Information Block (UDIB). Each UDIB contains 12 bits. When no error encoding is employed, each UDIB nets 12 user data bits. Majority error correction coding, where the sector contains three identical copies of the same RF burst nets four error corrected data bits. Majority coding is employed on all sectors comprising both the Command and Control Channel and Attention Channels.

On entry to the Active state, the PEA initializes registers and waits until the beginning of the next frame. At that time, it accesses its TDMA control memory, resident in the 1024×16 BCC SRAM, to determine 1) when it should transmit or receive data, 2) which sub-channel, and 3) which error correction to apply. The data then being transmitted and received by each PEA will then depend on its application or function within the ensemble, e.g. as a sensor, actuator or other type of component.

As will be understood by those skilled in the art, the use of sparse codes, pseudorandomly selected, together with error correction coding, renders the data communication provided by the present invention highly reliable and relatively unsusceptible to interference from similar networks operating nearby. Further, the utilization of low duty cycle pulse mode transmission particularly with the employment of uncorrelated codes in a TDMA context, leads to very low power consumption since the transmitters and receivers in each PEA are powered for only a small percentage of the total time.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A data network system for effecting coordinated operation of a plurality of electronic devices, said system comprising:
   a server microcomputer unit;
   a plurality of peripheral units which are battery powered and portable, which provide either input information from the user or output information to the user, and which are adapted to operate within short range of said server unit;
   said server microcomputer incorporating an RF transmitter for sending commands and synchronizing information to said peripheral units;
   said peripheral units each including an RF receiver for detecting said commands and synchronizing information and including also an RF transmitter for sending input information from the user to said server microcomputer;
   said server microcomputer including a receiver for receiving input information transmitted from said peripheral units;
   said server and peripheral transmitters being energized in low duty cycle RF bursts at intervals determined by a code sequence which is timed in relation to said synchronizing information.

2. A data network system as set forth in claim 1 wherein said server and peripheral units are allocated respective time slots within a predetermined frame interval for transmitting.

3. A data network system as set forth in claim 2 wherein a code sequence for a given one of said units is transmitted within a respective time slot.

4. A data network system as set forth in claim 1 wherein said server microcomputer unit transmits RF synchronizing beacons at times within each of a predetermined sequence of frames which times vary in accordance with a code unique to the particular server microcomputer unit.

5. A data network system for effecting coordinated operation of a plurality of electronic devices, said system comprising:
   a server microcomputer;
   a plurality of peripheral units which are battery powered and portable, which provide either input information from the user or output information to the user, and which are adapted to operate within about 20 meters of said server unit;
   said server microcomputer incorporating an RF transmitter for sending commands and synchronizing information to said peripheral units during allocated time slots within an overall time frame;
   said peripheral units including an RF receiver for detecting said commands and synchronizing information and including also an RF transmitter for sending input information from the user to said server microcomputer during respective allocated time slots within said overall time frame;
   said server microcomputer including a receiver for receiving input information transmitted from said peripheral units;
   said server and peripheral transmitters being energized in low duty cycle pulses at pseudo-random intervals within each of said allocated time slots, said pseudo-random intervals being determined by a code sequence which is timed in relation to said synchronizing information.

6. A data network system for effecting coordinated operation of a plurality of electronic devices, said system comprising:
   a server microcomputer unit, said server unit including an oscillator for establishing a time base;
   a plurality of peripheral units which are battery powered and portable and which provide either input information from the user or output information to the user;

said server microcomputer incorporating an RF transmitter controlled by said oscillator for sending commands and synchronizing information to said peripheral units;

said peripheral units each including an RF receiver for detecting said commands and synchronizing information and including also a local oscillator which can be synchronized to said server unit oscillator using said synchronizing information and an RF transmitter controlled by said local oscillator for sending input information from the user to said server microcomputer;

said server microcomputer including a receiver controlled by said server unit oscillator for receiving input information transmitted from said peripheral units;

said server and peripheral transmitters being energized in low duty cycle RF bursts which are timed in relation to said synchronizing information.

7. A data network system as set forth in claim 6 wherein said server and peripheral units are allocated respective time slots within a predetermined frame interval for transmitting.

8. A data network system as set forth in claim 6 wherein said input and output information is carried by frequency modulation of the respective transmitters and the receivers employ the respective oscillators for detecting the frequency modulation.

9. A data network system for effecting coordinated operation of a plurality of electronic devices, said system comprising:

a server microcomputer unit, said server unit including an oscillator for establishing a time base;

a plurality of peripheral units which provide either input information from the user or output information to the user, and which are adapted to operate within about 20 meters of said server unit;

said server microcomputer incorporating an RF transmitter controlled by said oscillator for sending commands and synchronizing information to said peripheral units, said synchronizing information being carried by time spaced beacons characteristic of the particular server unit;

said peripheral units each including an RF receiver for detecting said commands and synchronizing information and including also a local oscillator, each of said peripheral units being operative in a first mode to receive said beacons independently of synchronization of the respective local oscillator when that peripheral unit is in close proximity to said server unit and to determine from the server unit its characteristics, each of said peripheral units being operative in a second mode to synchronize the respective local oscillator with the server unit oscillator, each of said peripheral units also including an RF transmitter operative in a third mode for sending input information from the user to said server microcomputer, said server microcomputer including a receiver for receiving input information transmitted from said peripheral units;

said server and peripheral transmitters being energized in low duty cycle RF bursts at intervals with said receivers being controlled by the respective oscillators.

10. A data network system as set forth in claim 9 wherein said server and peripheral units are allocated respective time slots within a predetermined frame interval for transmitting.

11. A data network system for effecting coordinated operation of a plurality of electronic devices, said system comprising:

a server microcomputer unit, said server unit including an oscillator for establishing a time base;

a plurality of peripheral units which provide either input information from the user or output information to the user;

said server microcomputer incorporating an RF transmitter controlled by said oscillator for sending commands and synchronizing information to said peripheral units, said synchronizing information being carried by time spaced beacons;

said peripheral units each including an RF receiver for detecting said commands and synchronizing information and including also an RF transmitter for sending input information from the user to said server microcomputer;

said server microcomputer including a receiver for receiving input information transmitted from said peripheral units, said server microcomputer unit being operative to define a TDMA plan in which said server and peripheral units are allocated respective time slots within a predetermined frame interval for transmitting;

each of said peripheral units being operative in a first mode to receive said beacons from said server unit independently of synchronization of the respective local oscillator when the peripheral unit is in close proximity to the server unit and to determine the respective TDMA plan, each of said peripheral units being operative in a second mode to exchange input and output information with said server unit in accordance with the determined TDMA plan.

* * * * *